(12) United States Patent
Watanabe

(10) Patent No.: US 8,430,573 B2
(45) Date of Patent: Apr. 30, 2013

(54) OPTICAL CONNECTOR HOUSING, OPTICAL CONNECTOR CONNECTING DEVICE, AND ELECTRONIC APPARATUS

(75) Inventor: Takayuki Watanabe, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 390 days.

(21) Appl. No.: 12/722,871

(22) Filed: Mar. 12, 2010

(65) Prior Publication Data

US 2010/0260457 A1   Oct. 14, 2010

(30) Foreign Application Priority Data

Apr. 8, 2009   (JP) .................. 2009-094288

(51) Int. Cl.
   *G02B 6/38*   (2006.01)
(52) U.S. Cl.
   USPC .............. 385/55; 385/53; 385/62; 385/70; 385/76; 385/81; 385/86; 385/87; 385/89
(58) Field of Classification Search .............. None
   See application file for complete search history.

(56) References Cited

U.S. PATENT DOCUMENTS

| | | | |
|---|---|---|---|
| 4,690,494 A * | 9/1987 | Hirose et al. | 385/60 |
| 5,037,175 A * | 8/1991 | Weber | 385/76 |
| 5,091,991 A * | 2/1992 | Briggs et al. | 385/82 |
| 5,373,573 A * | 12/1994 | Welsh | 385/69 |
| 5,420,951 A | 5/1995 | Marazzi et al. | |
| 5,960,138 A | 9/1999 | Shimoji et al. | |
| 6,464,533 B1 * | 10/2002 | Ma et al. | 439/490 |

FOREIGN PATENT DOCUMENTS

| | | |
|---|---|---|
| JP | 6201952 A | 7/1994 |
| JP | 10307234 A | 11/1998 |
| JP | 2001141961 A | 5/2001 |

* cited by examiner

*Primary Examiner* — Uyen Chau N Le
*Assistant Examiner* — Chad Smith
(74) *Attorney, Agent, or Firm* — Westerman, Hattori, Daniels & Adrian, LLP

(57) ABSTRACT

An optical connector housing includes: a housing portion, which is capable of housing an optical connector having an arm retuning to a given posture by an elastic force of the arm, and which includes an exposure opening exposing an end portion of the housed optical connector; a stopper which restricts the optical connector from moving forward in an axial direction of the optical connector at such a position that the end portion of the optical connector projects from the exposure opening; and a push member which pushes the arm forward in the axial direction and which permits the housed optical connector to move backward in the axial direction.

1 Claim, 7 Drawing Sheets

OPTICAL CONNECTOR HOUSING, OPTICAL CONNECTOR CONNECTING DEVICE, AND ELECTRONIC APPARATUS

CROSS-REFERENCE TO RELATED APPLICATION

This application is based upon and claims the benefit of priority of the prior Japanese Patent Application No. 2009-094288, filed on Apr. 8, 2009, the entire contents of which are incorporated herein by reference.

FIELD

The embodiments discussed herein are related to an optical connector housing, an optical connector connecting device, and an electronic apparatus.

BACKGROUND

There is known an adaptor for connecting optical connectors to each other. Additionally, there is known an optical connector having an arm. The related arts are disclosed in Japanese Laid-open Patent Publication No. 2001-141961 and Japanese Laid-open Patent Publication No. 10-307234.

In such an adaptor, there is no play relative to an optical connector in the axial direction. For this reason, depending on the manufacturing accuracy of the adaptor and the optical connector, the distance between the optical connectors is be made so small that the loads applied to theirs ferrules is so great, alternatively, the distance between the optical connectors is so great that the connection loss between the ferrules may be increased.

SUMMARY

According to an aspect of the embodiment, an optical connector housing includes: a housing portion, which is capable of housing an optical connector having an arm retuning to a given posture by an elastic force of the arm, and which includes an exposure opening exposing an end portion of the housed optical connector; a stopper which restricts the optical connector from moving forward in an axial direction of the optical connector at such a position that the end portion of the optical connector projects from the exposure opening; and a push member which pushes the arm forward in the axial direction and which permits the housed optical connector to move backward in the axial direction.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENTS

A description will be given of embodiments with reference to the accompanying drawings.

[First Embodiment]

Figure 1A:
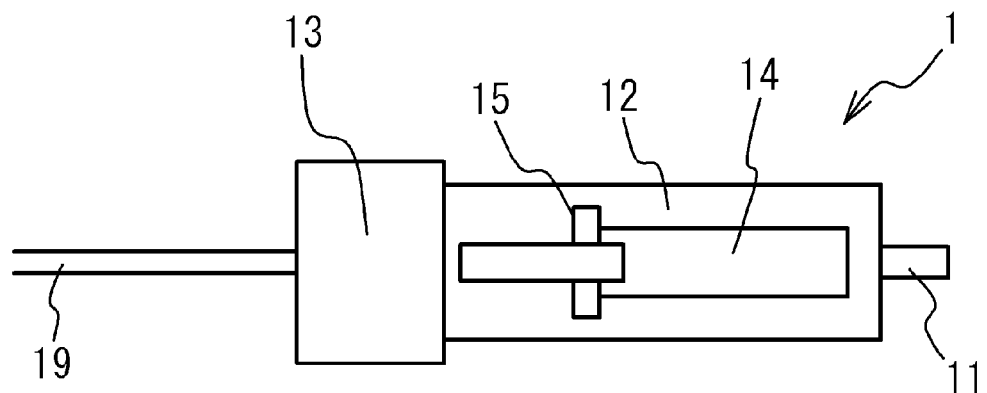
FIGS. 1A and 1B are explanatory views of an optical connector.
Figure 1B:
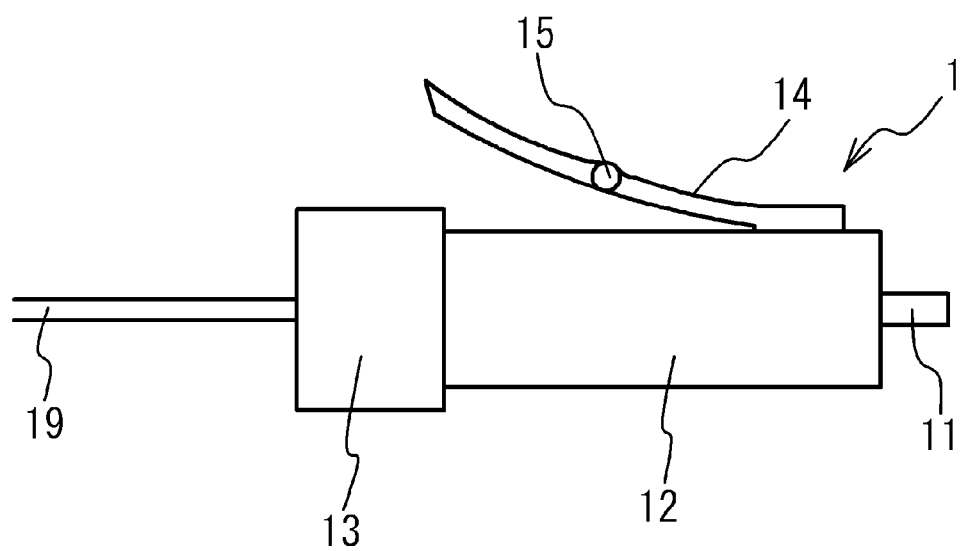

FIGS. 1A and 1B are explanatory views of an optical connector 1. FIG. 1A illustrates an upper surface of the optical connector 1. FIG. 1B illustrates a side surface of the optical connector 1. A ferrule 11 holds an optical fiber. A tube portion 12 holds the ferrule 11. A holding portion 13 is provided at an approximate end of the tube portion 12. A latch arm 14 is provided at a side surface of the tube portion 12. An optical fiber cable 19 is inserted into the holding portion 13.

As illustrated in FIG. 1B, the latch arm 14 maintains its posture to be inclined relative to the tube portion 12. The latch arm 14 is capable of returning to the inclined posture by its elastic force. For example, after the latch arm 14 is pressed toward the tube portion 12 side by a finger and the finger recedes from the latch arm 14, the latch arm 14 returns to the inclined posture by its elastic force. The latch arm 14 extends backward in an axial direction of the optical connector 1. The latch arm 14 is provided with an engagement projection 15. Usually, the engagement projection 15 engages an engagement hole provided in an adaptor into which the optical connector 1 is inserted. In this way, the position of the optical connector 1 is defined relative to the adaptor.

Figure 2A:
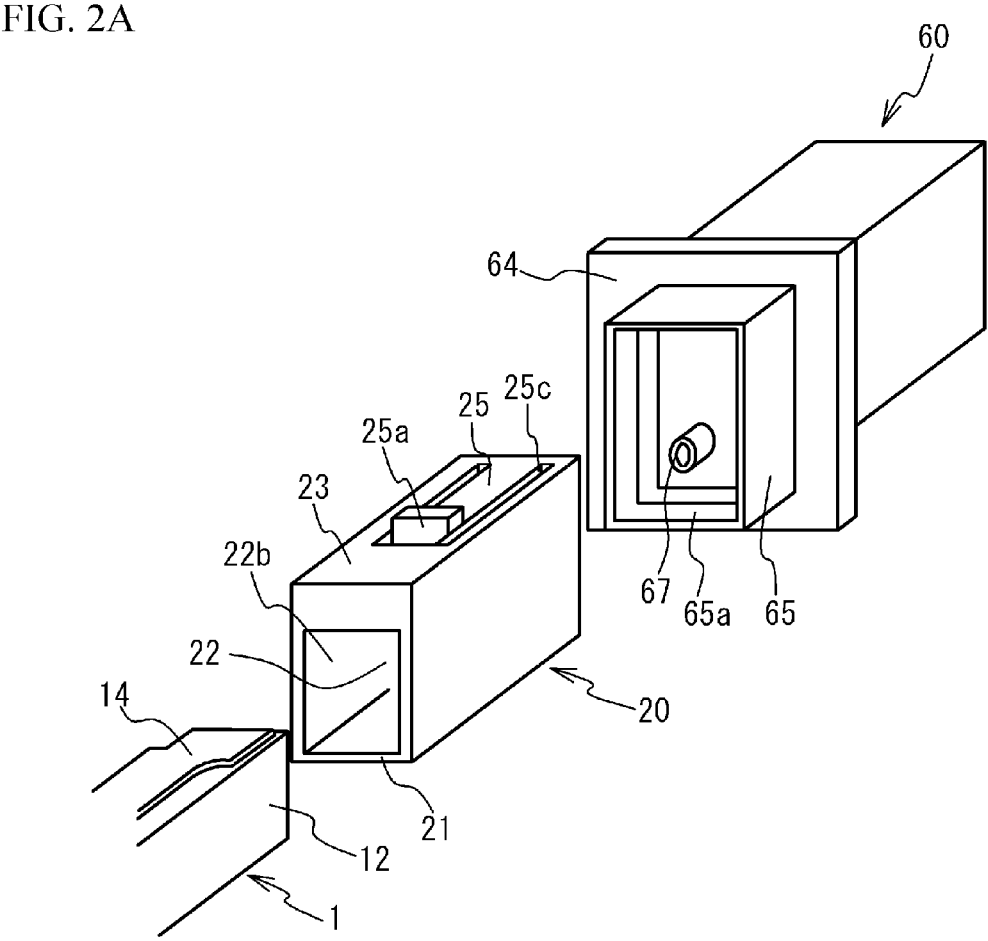
FIGS. 2A and 2B are explanatory views of an housing.
Figure 2B:
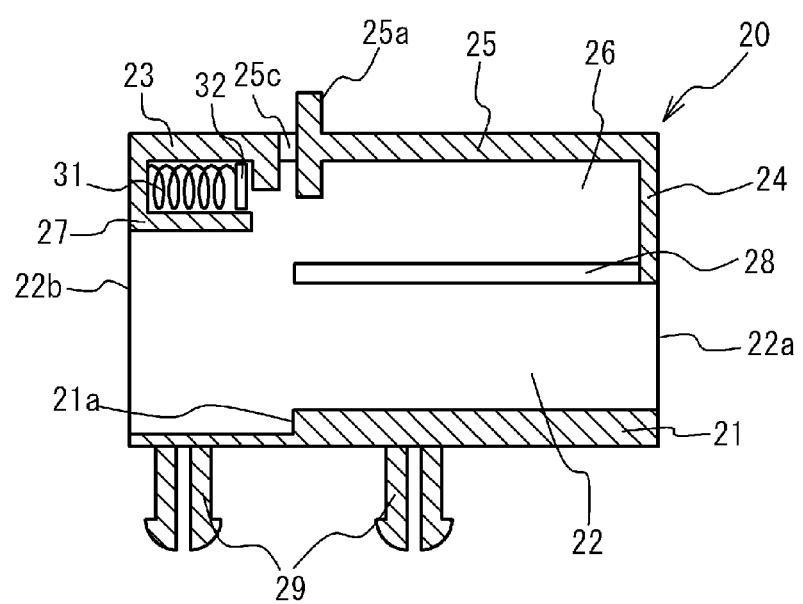

Next, a housing 20 will be described. FIGS. 2A and 2B are explanatory views of the housing 20. Additionally, FIG. 2A illustrates an adaptor 60, as will be described later. Leg portions 29 are omitted in FIG. 2A. As illustrated in FIGS. 2A and 2B, the housing 20 has a housing portion 22 for housing the optical connector 1. The housing portion 22 includes: an exposure opening 22a exposing an end portion of the optical connector 1 housed in the housing portion 22; and an inserting and removing opening 22b permitting the optical connector 1 to be inserted into and removed from. Specifically, the housing portion 22 houses the tube portion 12 and the holding portion 13. The exposure opening 22a is formed at a front wall 24.

The housing 20 includes an arm housing portion 26 housing the latch arm 14. The housing 20 includes a separation wall 28 separating the housing portion 22 from the arm housing portion 26. A cutout 25c which defines an operational portion 25 is provided at an upper wall 23, and has a substantial letter U shape. A projection portion 25a is provided at an end portion of the operational portion 25. Two leg portions 29 which secure the housing 20 on a printed substrate are provided at a bottom surface of the housing 20. The leg portion 29 includes plural projection pieces, which are elastically deformable so as to come into contact with each other. A flange portion is formed at an end of the projection piece. The leg portion 29 will be described later in detail.

As illustrated in FIG. 2B, the housing 20 includes a bottom wall 21 supporting the tube portion 12 and the holding portion 13. A step portion 21a is provided at an inner surface of the bottom wall 21. As will be described later in detail, the step portion 21a and the front wall 24 serve as a stopper for restricting the optical connector 1 from moving forward in the axial direction. The separation wall 28 is provided with an escape slot which permits the movement of the latch arm 14. This escape slot extends in the axial direction of the optical connector 1 housed within the housing portion 22. Further, a spring housing portion 27 which houses a push piece 32 and a spring 31 is provided within the housing 20. The push piece 32 comes into contact with an end of the latch arm 14. The spring 31 biases the push piece 32 toward the latch arm 14. The push piece 32, for example, has a thin plate shape and is made of a metal.

Figure 3A:
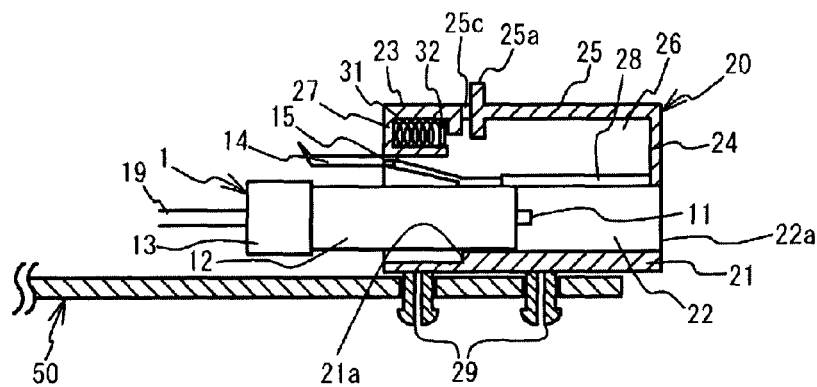
FIGS. 3A to 3C are explanatory views of insertion of the optical connector into the housing and fitting the adaptor into the housing.

Next, a description will be given of the insertion of the optical connector 1 into the housing 20, and the fitting of the housing 20 into the adaptor 60. As illustrated in FIG. 3A, firstly, the leg portion 29 is inserted into a hole formed in a printed substrate 50, and the housing 20 is assembled into the printed substrate 50. Additionally, the hole formed in the printed substrate 50 is provided at such a position that the end of the housing 20 protrudes from the printed substrate 50 with the housing 20 assembled into the printed substrate 50.

Figure 3B:
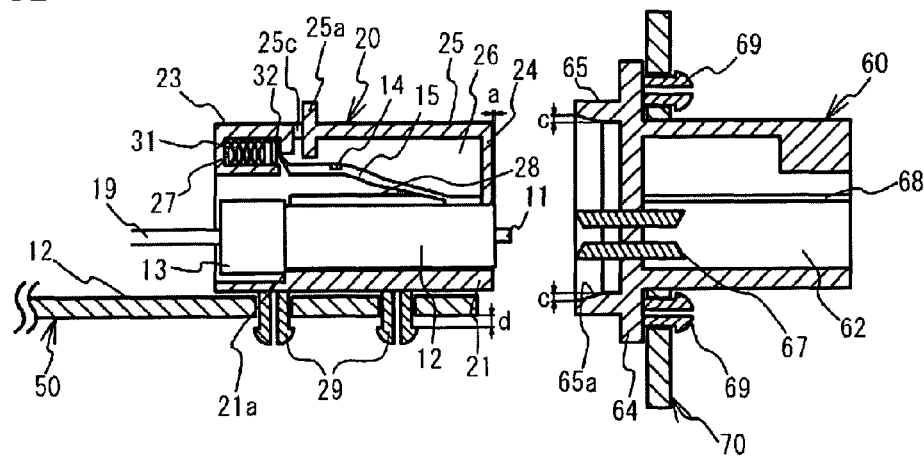

Next, the optical connector 1 is inserted into the inserting and removing opening 22b. At this time, the latch arm 14 comes into contact with a wall surface, which defines the spring housing portion 27, to be pushed toward the tube portion 12 side. When the optical connector 1 is pushed forward in the axial direction from the state illustrated in FIG. 3A, the latch arm 14 moves along the escape slot provided in the separation wall 28. When the optical connector 1 is inserted such that the latch arm 14 passes through the spring housing portion 27, the tube portion 12 and the holding portion 13 are housed in the housing portion 22 as illustrated in FIG. 3B. The latch arm 14 is housed in the arm housing portion 26.

In the housed state, the holding portion 13 abuts the step portion 21a, the root of the latch arm 14 abuts the inner surface of the front wall 24, and the end of the optical connector 1 is exposed from the exposure opening 22a. Further, the end of the latch arm 14 abuts the push piece 32, and then the latch arm 14 is biased forward in the axial direction by the spring 31 via the push piece 32. That is, the optical connector 1 is biased forward in the axial direction by the spring 31 and the push piece 32. This maintains the abutment of the holding portion 13 and the step portion 21a and the abutment of the latch arm 14 and the front wall 24.

In the housed state, the end portion of the tube portion 12 projects from the exposure opening 22a by a given length "a". For example, the length "a" is about 400 μm. Further, a length "d" of the play between the leg portion 29 and the printed substrate 50 is set in such a direction to project the leg portion 29. Therefore, the housing 20 is secured on the printed substrate 50 with the play having the length "d" in the axial direction of the leg portion 29. The length "d" is, for example, about 500 μm.

Next, the housing 20 in the housed state is fitted into the adaptor 60. The adaptor 60 is secured on a printed substrate 70. The adaptor 60 includes a housing portion 62 which is capable of housing a connector opposite to the optical connector 1. The adaptor 60 includes a front wall 64, and a fitting portion 65 having a frame shape and provided at a front side of the front wall 64. The size of the fitting portion 65 is set to fit the housing 20. Further, the fitting portion 65 is provided at its inner side surface with an inclined surface 65a which is inclined relative to the axial direction. The inclined surface 65a comes into contact with the outer surface of the housing 20.

The front wall 64 is provided with a sleeve 67 for ensuring the connection of the ferrule 11 of the optical connector 1 and a ferrule of the opposite optical connector. The sleeve 67 has a cylinder shape. The ferrules are connected with each other within the sleeve 67. In addition, the front wall 64 is provided at its rear side with leg portions 69 for securing the adaptor 60 in the printed substrate 70. The leg portions 29 and 69 each have substantially similar structures and functions.

The length "c" of the inclined surface 65a in the direction perpendicular to the axial direction of the adaptor 60 is set to correspond to the length "d" as mentioned above. For example, when the length "d" is smaller than or equal to about 500 μm, the length "c" is about 500 μm. Therefore, even when there are variations in the position of the housing 20 relative to the printed substrate 50, the housing 20 and the adaptor 60 can be fitted with each other.

Figure 3C:
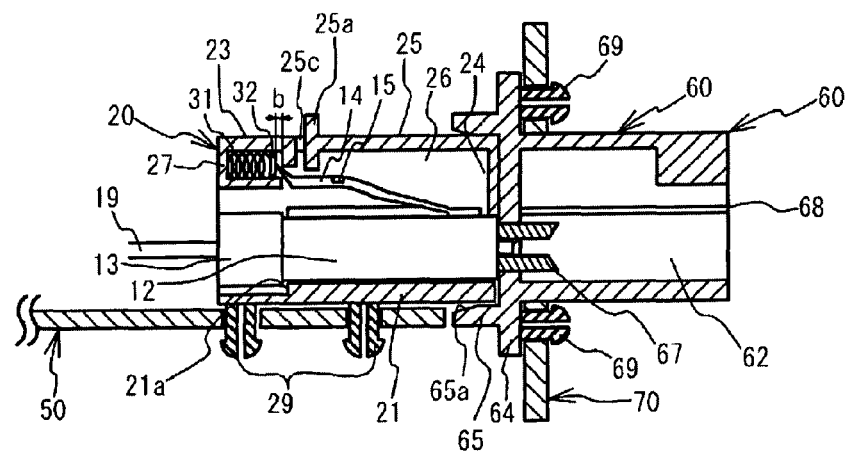

The printed substrate 50 is inserted into the printed substrate 70 to fit the housing 20 into the fitting portion 65. The end portion of the optical connector 1 projects from the exposure opening 22a by the length "a". For this reason, at the time of fitting, the end portion of the optical connector 1 abuts the front surface of the front wall 64 to be pushed backward in the axial direction, and the front wall 24 abuts the front wall 64, as illustrated in FIG. 3C. That is, the housing 20 and the adaptor 60 are fitted with each other against the biasing force of the spring 31 which biases the optical connector 1 forward in the axial direction. In the fitted state, the spring 31 biases the optical connector 1 forward in the axial direction. Thus, the optical connector 1 is constantly biased toward the adaptor 60 side.

In this way, the housing 20 holds the optical connector 1 while permitting the optical connector 1 to move backward in its axial direction. Specifically, the spring 31 permits the optical connector 1 to move backward its axial direction and pushes the latch arm 14 forward in the axial direction. Therefore, even when there is dimensional error of the optical connector 1, the housing 20, and the adaptor 60 due to the manufacturing accuracy thereof, the connection of the optical connector 1 and the opposite optical connector can be ensured. Since the connection of the optical connector 1 and the opposite optical connector can be ensured, the connection loss is suppressed. Further, the optical connector 1 is permitted to move backward relative to the housing 20 in the axial direction, thereby preventing the load applied to the ferrules connected with each other from being increased too much.

Furthermore, when the play between the ferrules connected with each other in the axial direction is too large, rattling of the optical connectors may be caused in the axial direction, and the connection loss between the ferrules may be increased. However, the optical connector 1 tends to move forward in the axial direction by the elastic repulsive force of the latch arm 14, as described above. Consequently, the play between the optical connectors in the axial direction can be absorbed, thereby suppressing the connection loss.

Figure 4A:
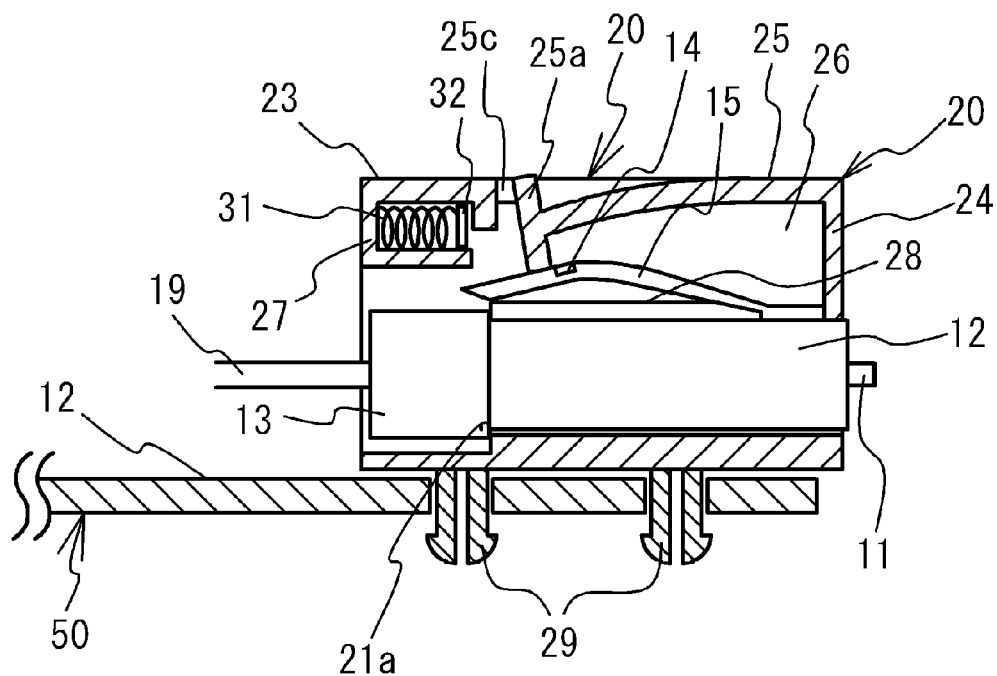
FIG. 4A is an explanatory view of removing of the optical connector from the housing.
Figure 4B:
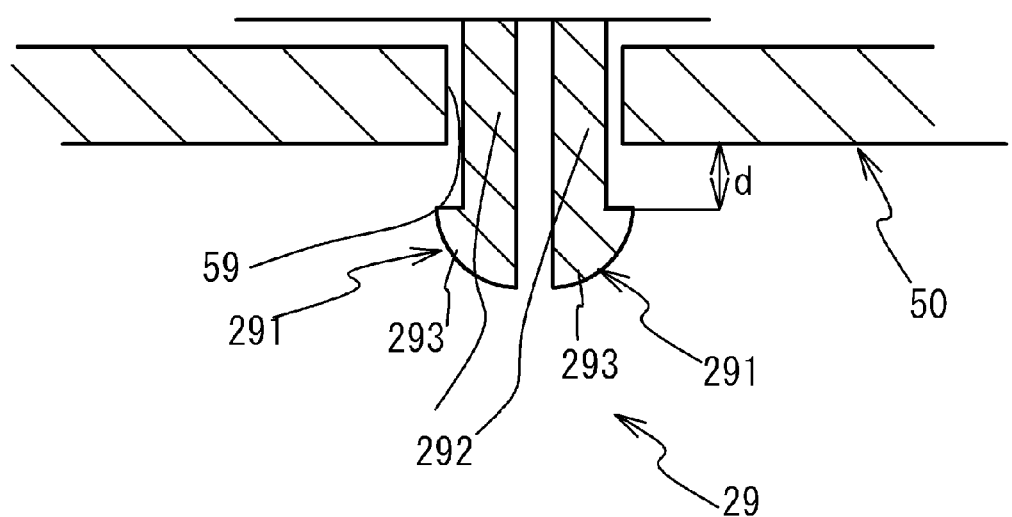
FIG. 4B is an enlarged view of a leg portion.

Next, a description will be given of removal of the optical connector 1 from the housing 20. FIGS. 4A and 4B are explanatory views of removal of the optical connector 1 from the housing 20.

As illustrated in FIG. 4A, an operator pushes the projection portion 25a to bend the operational portion 25, whereby the projection portion 25a pushes the latch arm 14 toward the tube portion 12 side. Therefore, the end portion of the latch arm 14 moves away from the push piece 32. In this state, the optical connector 1 is pulled, thereby removing the optical connector 1 from the housing portion 22 without interfering the latch arm 14 with the spring housing portion 27.

Next, the leg portion 29 will be described.

FIG. 4B is an enlarged view of the leg portion 29. The leg portion 29 includes a pair of projection pieces 291. The projection pieces 291 are elastically deformable to come closer to each other. The projection piece 291 includes: a body portion 292 extending from the bottom wall 21; and a flange portion 293 formed at an end of the body portion 292. The length of the body portion 292 is set to be longer than the thickness of the printed substrate 50. The length "d" of play between the leg portion 29 and the printed substrate 50 is set in such a direction that the body portion 292 projects.

When the leg portion 29 is inserted into a hole 59 formed in the printed substrate 50, the projection pieces 291 are close to each other to pass through the hole 59. The flange portion 293 disengages the hole 59, fitting of the hole 59 and the leg portion 29 is accomplished. In this way, assembling the housing 20 into the printed substrate 50 is performed.

Figure 5A:
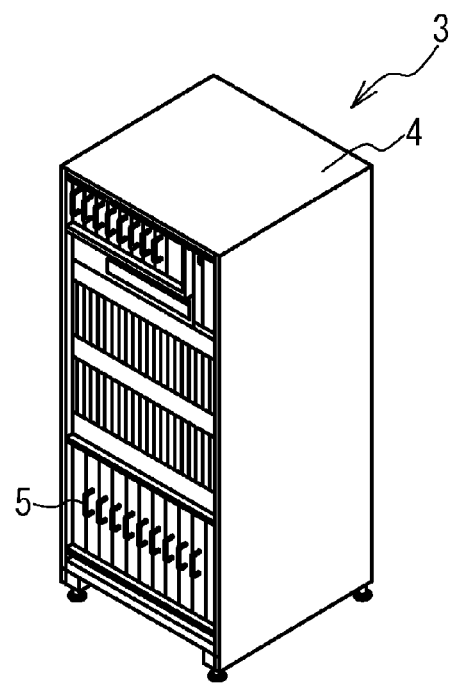
FIGS. 5A to 5B are explanatory views of an electronic apparatus.
Figure 5B:
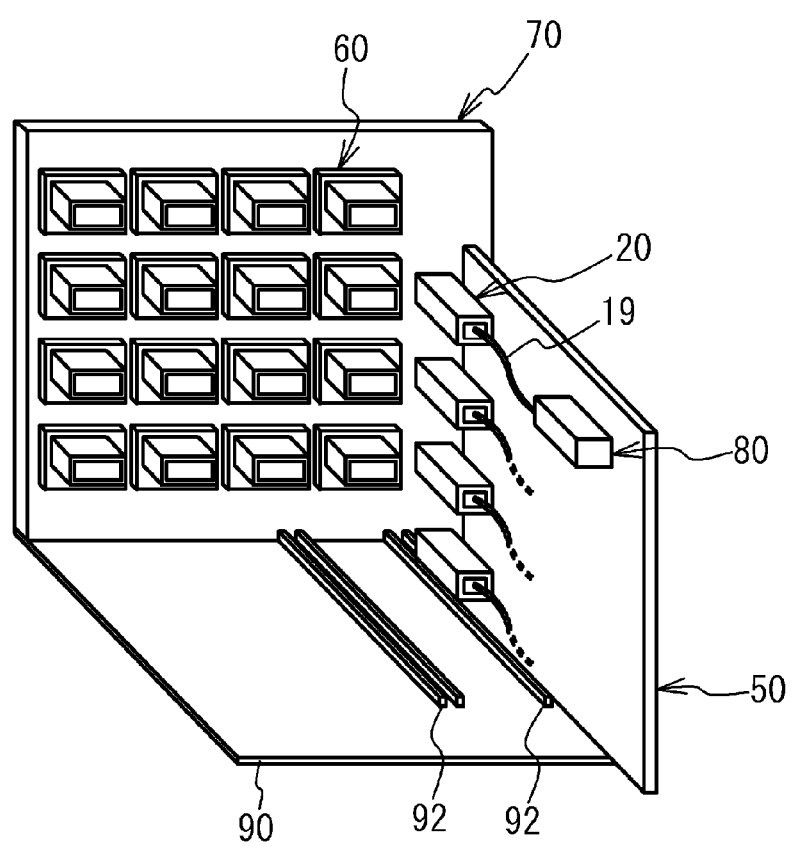

Next, a description will be given of an electronic apparatus employing the printed substrates 50 and 70 in which the housing 20 and the adaptor 60 are respectively mounted. FIGS. 5A and 5B are explanatory views of the electronic apparatus. FIG. 5A schematically illustrates a rack-mount apparatus in which the electronic apparatus is mounted. As illustrated in FIG. 5A, a rack-mount apparatus 3 includes a chassis 4, and plural electronic units 5 housed in the chassis 4. For example, the rack-mount apparatus 3 is a server apparatus. The electronic unit 5 is insertable into and removable from the chassis 4. The printed substrate 50 in which the plural housings 20 are mounted is employed in the electronic unit 5.

FIG. 5B illustrates the connection method of the optical connector. The printed substrate 70 is installed within the rack-mount apparatus 3. The adaptors 60 are mounted in the printed substrate 70. The printed substrate 70 corresponds to a backplane. In addition, one end side of the adaptor 60 is a side into which the electronic unit 5 is inserted, and the other end side of the adaptor 60 is a rear side of the rack-mount apparatus 3. The plural housings 20 are mounted in the printed substrate 50. The housing 20 holds the optical connector 1, and the optical connector 1 is connected to an optical module 80 mounted in the printed substrate 50.

Further, a supporting plate 90 including guide rails 92 is provided within the rack-mount apparatus 3. The insertion of the printed substrate 50 is guided by the guide rail 92, thereby fitting the housing 20 into the adaptor 60. Accordingly, the opposite optical connector is inserted into the adaptor 60, thereby connecting the opposite optical connector with the optical connector 1. In addition, an injector, not illustrated and provided in the chassis 4 side, secures and releases the printed substrate 50 and the supporting plate 90 after the housing 20 is fitted into the adaptor 60. The injector is known. When the electronic unit 5 is removed from the rack-mount apparatus 3, the release is performed by the above injector to remove the electronic unit 5 from the rack-mount apparatus 3. This allows the housing 20 to be removed from the adaptor 60.

[Second Embodiment]

Figure 6A:
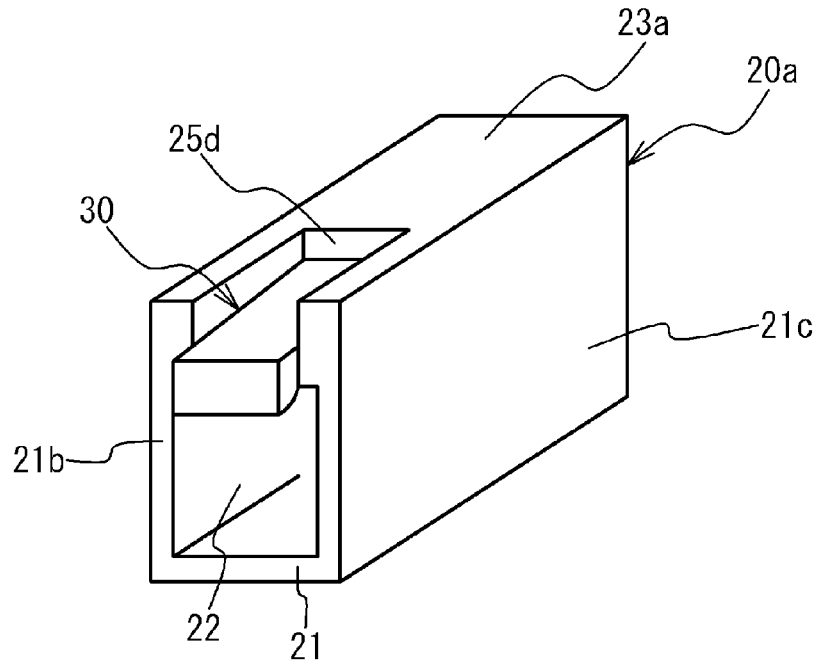
FIGS. 6A to 6C are explanatory views of a housing according to a second embodiment.
Figure 6B:
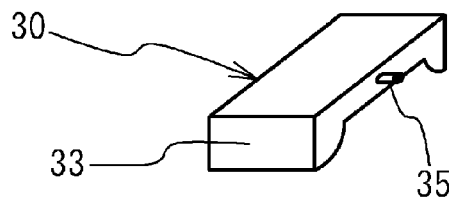
Figure 6C:
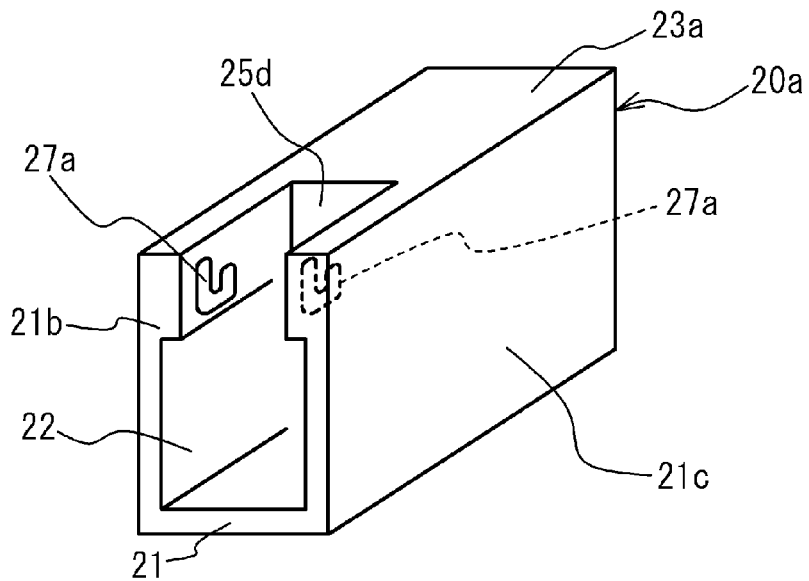

Next, a description will be given of a housing 20a according to the second embodiment. FIGS. 6A to 6C are explanatory views of the housing 20a according to the second embodiment. Additionally, the leg portion 29 is omitted in FIGS. 6A to 6C. Like the housing 20 according to the first embodiment, the housing 20a is fittable into the adaptor 60.

As illustrated in FIG. 6A, a push member 30 is assembled into the housing 20a. FIG. 6B illustrates the push member 30 removed from the housing 20a. FIG. 6C illustrates the housing 20a from which the push member 30 is removed. The push member 30 includes: a base 33 having a thin plate shape; projections 35 respectively provided at both side surfaces of the base 33. For example, the push member 30 is made of a synthetic resin.

As illustrated in FIG. 6C, a cutout 25d is formed at an upper wall 23a of the housing 20a. The push member 30 is arranged in the cutout 25d. Grooves 27a are respectively provided at inner surfaces of inner walls 21b and 21c. The projection 35 rotatably engages the groove 27a. In this way, the push member 30 is supported by the inner walls 21b and 21c.

Figure 7A:
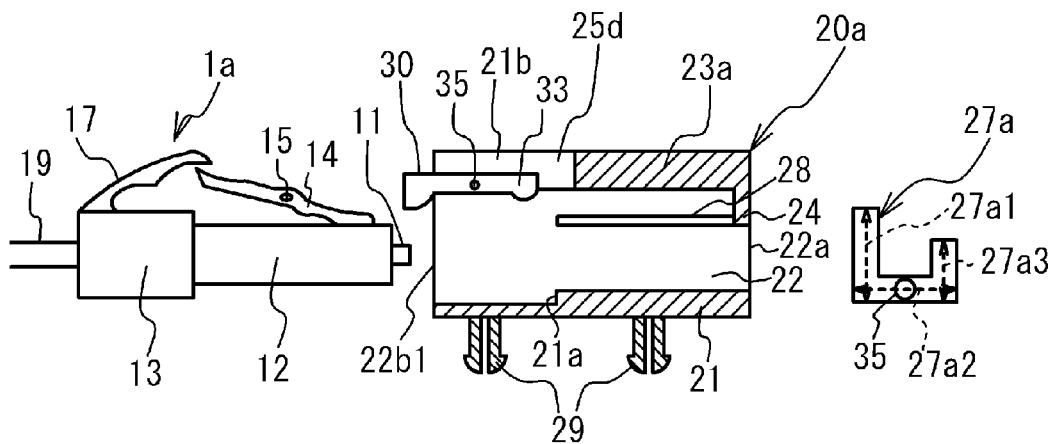
FIGS. 7A to 7C are explanatory views of insertion of the optical connector into the housing according to the second embodiment.
Figure 7B:
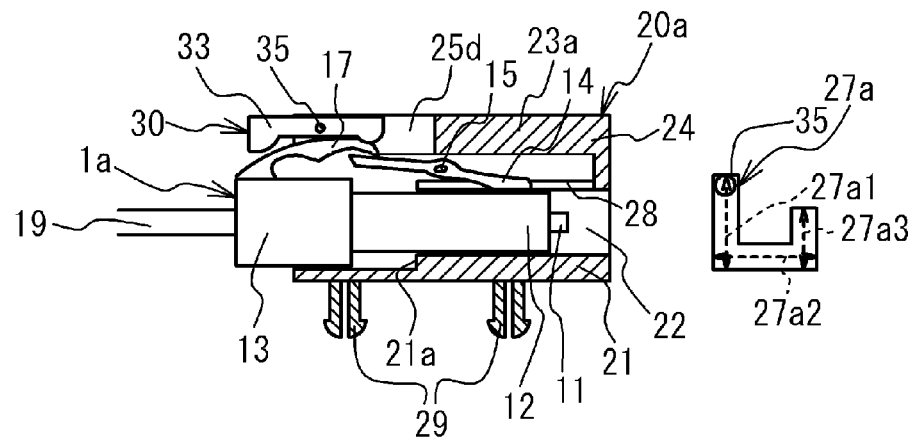
Figure 7C:
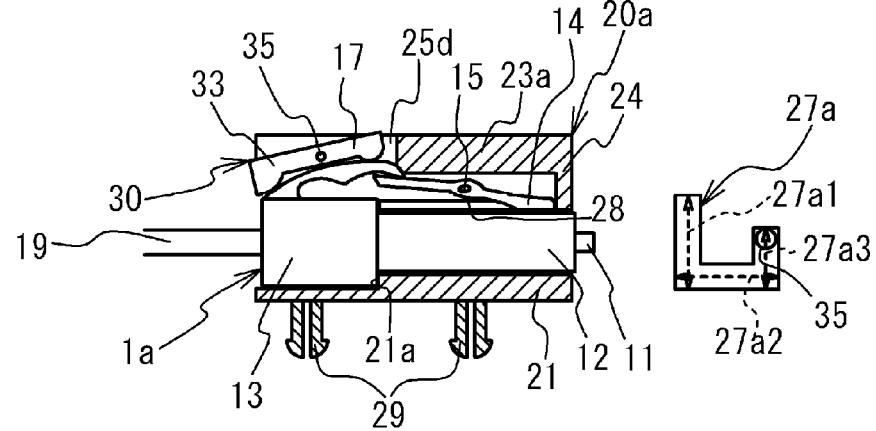

FIGS. 7A to 7C are explanatory views of the insertion of an optical connector 1a into the housing 20a according to the second embodiment. Further, the engagement state of the groove 27a and the projection 35 are illustrated on the right side of each of FIGS. 7A to 7C.

Unlike the above 1, the optical connector 1a is provided at its holding portion 13 with an arm 17. The arm 17 is provided at the holding portion 13. An end portion of the arm 17 overlaps the end portion of the latch arm 14. The arm 17 extends forward in the axial direction of the optical connector 1. Like the latch arm 14, the arm 17 retains its inclined posture relative to the holding portion 13. The arm 17 is capable of retuning to the inclined posture by its elastic force. When the arm 17 is pushed toward the holding portion 13 side, the arm 17 and the latch arm 14 are deformed along the holding portion 13 and the tube portion 12.

The groove 27a has a substantially letter U shape. The groove 27a includes regions 27a1, 27a2, and 27a3. The regions 27a1 and 27a3 are parallel to each other, and extend in the direction perpendicular to the axial direction of the optical connector 1a. The region 27a2 is continuous with the regions 27a1 and 27a3, and is parallel to the axial direction of the optical connector 1a. Further, an end portion of the region 27a1 is higher than an end portion of the region 27a3. In other words, the end portion of the region 27a1 is arranged apart from the bottom wall 21 more than the end portion of the region 27a3 is arranged.

In a case where the projection 35 is positioned within the region 27a2 as illustrated in FIG. 7A, even when attempting to insert the optical connector 1a into the housing portion 22, the insertion is difficult because the push member 30 interferes the latch arm 14 and the engagement projection 15. The projection 35 is moved toward the region 27a1 to move the push member 30 upward, thereby inserting the optical connector 1a into the housing portion 22 without interfering the push member 30 with the latch arm 14 and the arm 17 as illustrated in FIG. 7B. The optical connector 1a is inserted until the latch arm 14 abuts the front wall 24 and the holding portion 13 abuts the step portion 21a, and then the projection 35 is moved into the region 27a3. At the time when the projection 35 is moved into the region 27a3, the arm 17 is pushed against its elastic force to move the projection 35 into the region 27a3.

When the projection 35 is moved within the region 27a3, the push member 30 is moved upward by the elastically repulsive force of the arm 17, and then the projection 35 abuts the end portion of the region 27a3. Further, since the projection 35 rotatably engages the groove 27a, the push member 30 maintains a posture along the arm 17. The optical connector 1a is biased forward in the axial direction by the elastically repulsive forces of the arm 17 and the latch arm 14. Thus, the state where the holding portion 13 and the latch arm 14 respectively abut the step portion 21a and the front wall 24 is kept. In the state illustrated in FIG. 7C, like the housing 20 according to the first embodiment, the end portion of the optical connector 1a projects from the exposure opening 22a. Further, the optical connector 1a is pushed backward in the axial direction to elastically deform the arm 17, thereby permitting the optical connector 1a to move backward in the axial direction. Consequently, like the housing 20 according to the first embodiment, the housing 20a holds the optical connector 1a with the play therebetween in the axial direction of the optical connector 1a.

A description will be given of the removal of the optical connector 1a from the housing 20a. An operator moves the projection 35 into the region 27a1 against the biasing force of the arm 17 and the latch arm 14. Therefore, an inserting and removing opening 22b1 is exposed, thereby removing the optical connector 1a from the housing 20a. In this manner, the region 27a1 corresponds to a region that permits the optical connector 1a to be removed from the housing portion 22. The region 27a3 corresponds to a region that permits pushing of the optical connector 1a housed in the housing portion 22. As mentioned above, the push member 30 is supported to move between the position that permits the optical connector 1a to be removed and the position that permits the arm 17 to be pushed, by the inner walls 21b and 21c. Moreover, the grooves may be provided in the push member, and the projections engaging the grooves may be respectively provided at the side walls.

Additionally, the above embodiment has exemplified the optical connector of an LC type with a single core. However, the present invention is applicable to an optical connector housing holding an optical connector of the LC type with two cores.

All examples and conditional language recited herein are intended for pedagogical purposes to aid the reader in understanding the invention and the concepts contributed by the inventor to furthering the art, and are to be constructed as being without limitation to such specifically recited examples and conditions, nor does the organization of such examples in the specification relate to a showing of the superiority and inferiority of the invention. Although the embodiments of the present invention have been described in detail, it should be understood that the various changes, substitutions, and alterations could be made hereto without departing from the sprit and scope of the invention.

What is claimed is:

1. An electronic apparatus comprising:
    an optical connector connecting device comprising:
        an optical connector housing comprising:
            a housing portion which is capable of housing an optical connector having an arm returning to a given posture by the arm's elastic force, and which includes an exposure opening exposing an end portion of the housed optical connector;
            a stopper which restricts the optical connector from moving forward in an axial direction of the optical connector at such a position that the end portion of the optical connector projects from the exposure opening; and
            a push member which abuts and pushes the arm forward in the axial direction and which permits the housed optical connector to move backward in the axial direction; and
        an optical connector adaptor comprising:
            a fitting portion which fits the optical connector housing; and
            a housing portion which houses an opposite optical connector connectable to the optical connector;
    a first printed substrate in which the optical connector housing is mounted; and
    a second printed substrate in which the optical connector adaptor is mounted.

* * * * *